Oct. 28, 1952　　　G. W. FYLER　　　2,616,078
RADIO DETECTION AND RANGING SYSTEM
Filed Aug. 2, 1945　　　3 Sheets-Sheet 1
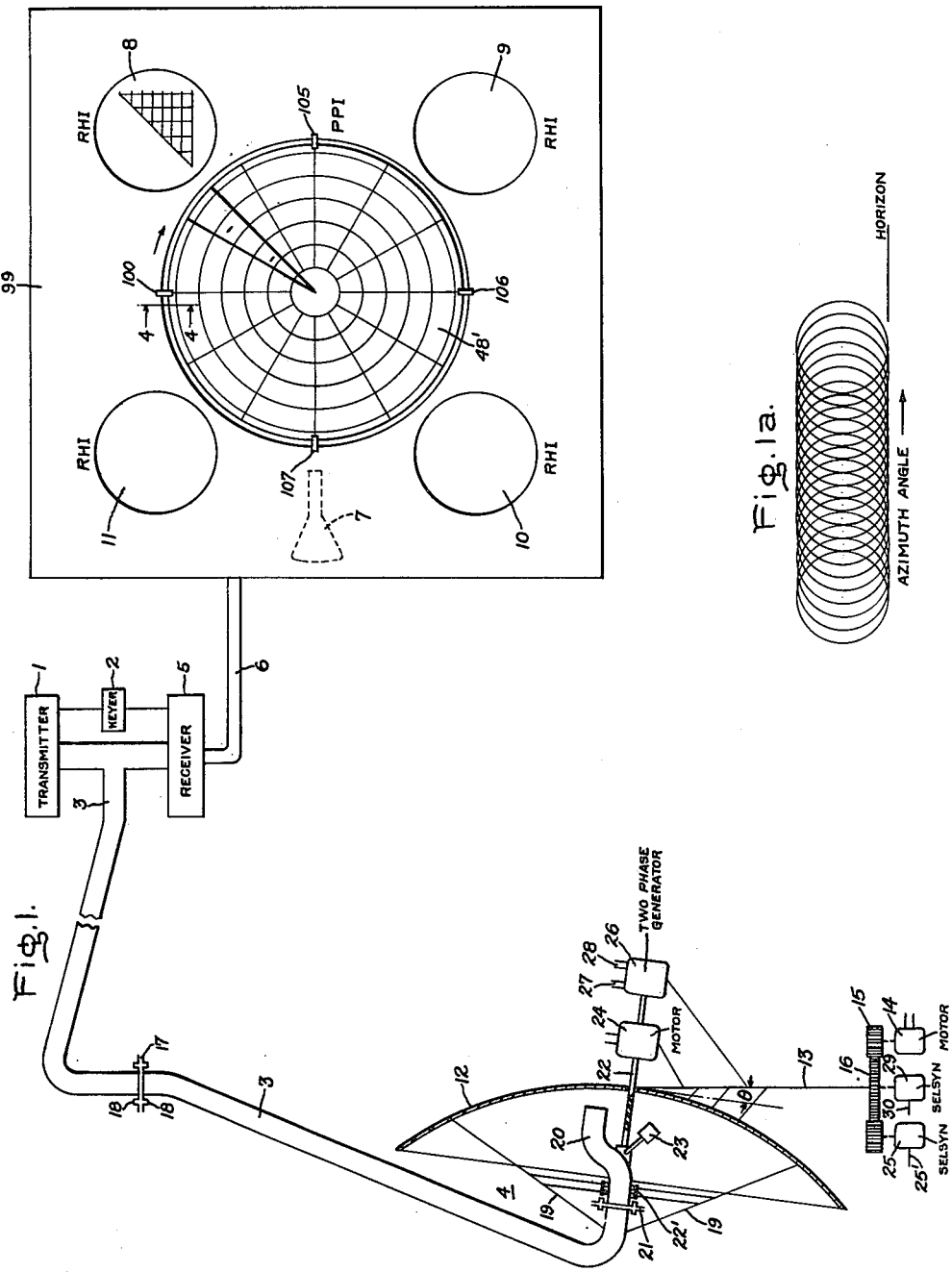
Inventor:
George W. Fyler,
by Merton D Morse
His Attorney.

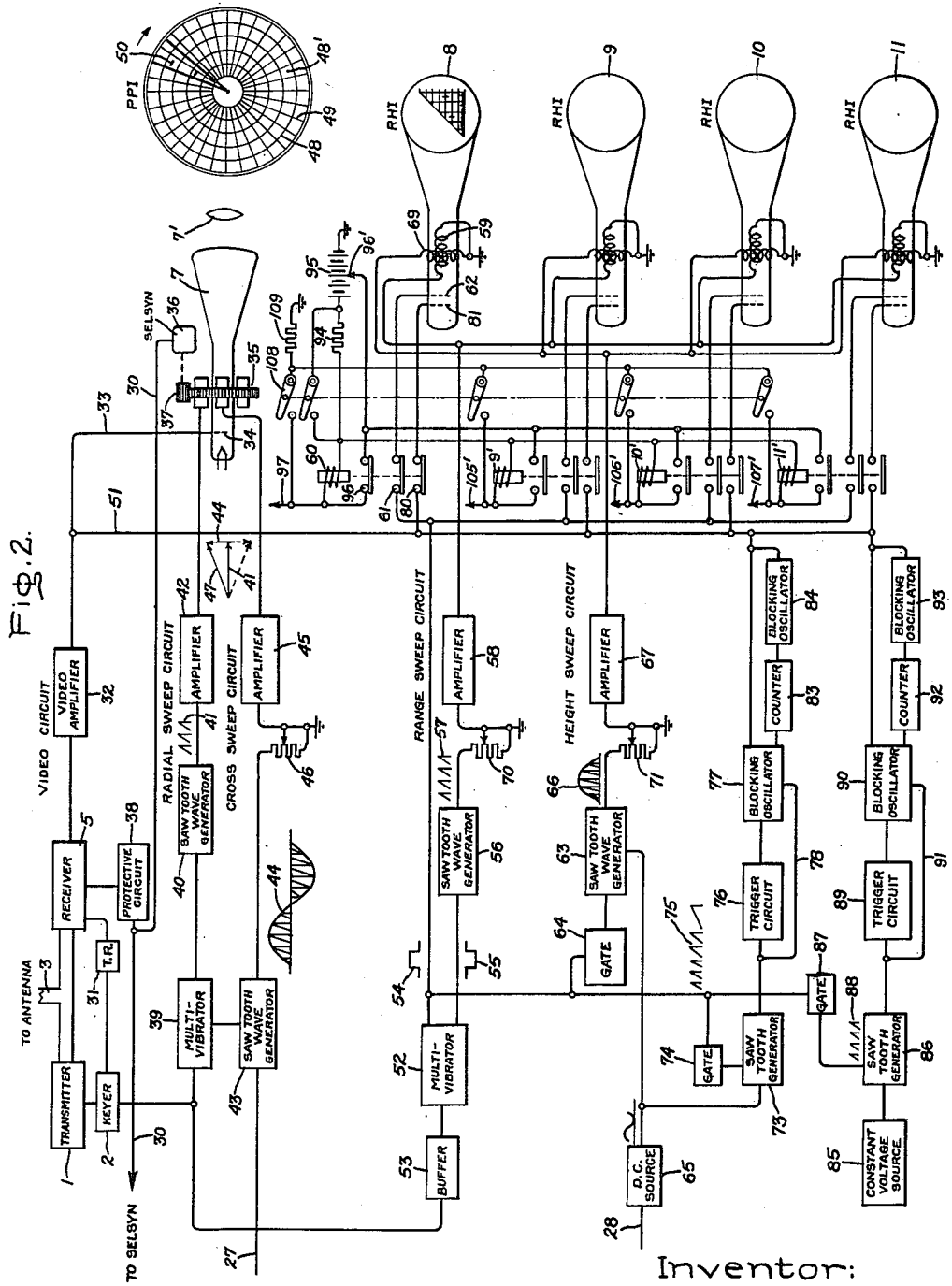

Oct. 28, 1952  G. W. FYLER  2,616,078
RADIO DETECTION AND RANGING SYSTEM
Filed Aug. 2, 1945  3 Sheets-Sheet 3
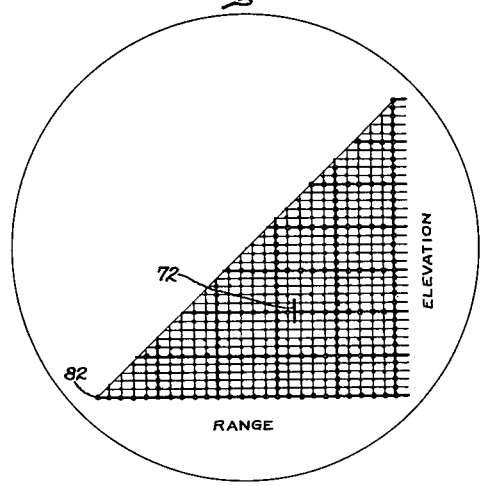
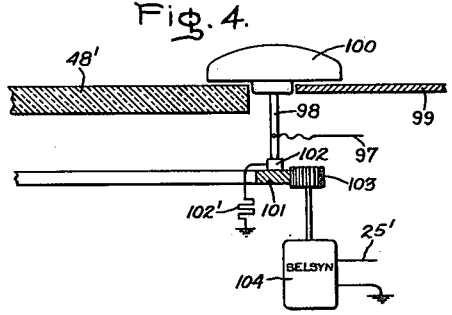
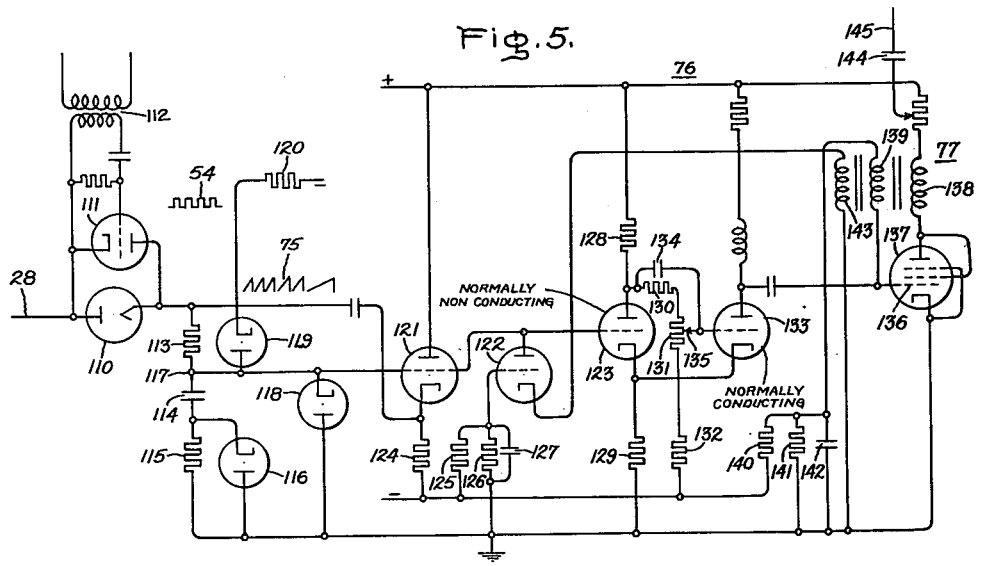
Inventor:
George W. Fyler,
by Merton D Morse
His Attorney.

Patented Oct. 28, 1952

2,616,078

UNITED STATES PATENT OFFICE 2,616,078

RADIO DETECTION AND RANGING SYSTEM

George W. Fyler, Stratford, Conn., assignor to General Electric Company, a corporation of New York Application August 2, 1945, Serial No. 608,574

20 Claims. (Cl. 343—11)

My invention relates to radio detection and ranging systems in which recurrent pulses are radiated and echoes thereof from remote objects are received at times dependent upon the distance of such remote objects.

It is a primary object of my invention to provide a new and improved radio detection and ranging system which provides accurate location of an object in space as to azimuth, range, and elevation.

It is another object of my invention to provide a new and improved range and elevation detecting means.

It is a further object of my invention to provide a new and improved antenna for a radio detection and ranging system.

It is still another object of my invention to provide a new and improved rotating antenna for a radio ranging and detecting system which may be connected to a wave guide and which is dynamically balanced.

It is a still further object of my invention to provide a new and improved pulse echo system which gives a progressively scanned picture of objects in space.

It is still another object of my invention to provide new and improved circuits for translating the rotary space scanning of an antenna to a simple harmonic scanning on a cathode ray tube.

It is a still further object of my invention to provide a new and improved cathode ray tube circuit for imposing a system of rectangular coordinates on the picture displayed on the tube.

It is still another object of my invention to provide a new and improved system for simultaneously indicating the plan position of a reflecting object and the range and elevation of that object on separate cathode ray tubes.

It is a still further object of my invention to provide new and improved radio detecting and ranging systems which permit a plurality of observers to make observations concurrently of the positions of different reflecting objects, the information for the respective objects being transmitted sequentially to the respective observers.

One of the features of my invention is the provision in a radio detecting and ranging system of a plan position indicator and a plurality of range height indicators, the range height indicators being so connected with the plan position indicator that each is energized sequentially in accordance with the particular portion of the plan position indicator being scanned.

Another feature of my invention consists in the provision of means for scanning a parabolic reflector of an antenna for three-dimensional coverage, a rotating conical scanning beam being projected into space and reflected echoes being properly positioned upon a plan position indicator by means which translate the rotating scan of the antenna to a simple harmonic scanning action on a cathode ray tube.

Another feature of my invention consists in the provision of a cathode ray tube upon which range and height information is displayed and upon which a background, in the form of a rectangular coordinate system, is provided to assist in accurately determining the range and elevation of a reflecting object in space.

By the term "echo" or "echo pulse" as used herein, I refer to any pulse received as a result of the pulse transmitted by the equipment whether the received pulse be produced by reflection from a remote object, or by reason of operation of apparatus carried by such remote object.

Other objects of my invention will appear from the following description of my invention and the novel features which I believe to be characteristic of my invention are set forth with particularly in the appended claims. My invention itself, however, both as to its organization and method of operation together with further objects and advantages thereof may best be understood by reference to the following description taken in connection with the accompanying drawing in which Figs. 1 and 1a are diagrammatic illustrations of an embodiment of my invention and a characteristic thereof; Fig. 2 is a diagrammatic representation of a portion of the circuits of the equipment employed in the apparatus of Fig. 1; Fig. 3 illustrates the rectangular coordinates produced on the cathode ray tube of the apparatus of Fig. 1; Fig. 4 is a cross-sectional elevation view of the portion of the apparatus of Fig. 1 taken along the lines 4—4; Fig. 5 represents certain details of the equipment shown in Fig. 2; and Fig. 6 illustrates an alternative control circuit.

In certain of the figures, I have represented by rectangles or blocks different apparatus units, the details of which are unnecessary to consider in the present application or the details of which are represented in other figures of the drawing. Circuit connections between these various apparatus units are represented by a single line on the diagram representing a single conductor and by the conventional representation of ground. It will be understood that one side of each circuit may be grounded and, therefore, the grounded conductor of each circuit is not shown on the drawing, only conductors carrying potential with respect to ground being shown on the drawing.

Referring to Fig. 1 of the drawing, I have indicated in the central portion thereof a transmitter 1 which is recurrently pulsed by means of a keyer 2 to supply high frequency pulses over a wave guide 3 to an antenna 4 so that the high frequency pulses may be radiated into space. Echoes of the radiated pulses received by the antenna 4 are supplied over wave guide 3 to a receiver 5 where they are converted in frequency, amplified, and detected to produce unidirectional pulses corresponding to the outgoing pulse and to each of its received echoes. These unidirectional pulses are supplied over a channel 6 to the control electrode of a cathode ray indicator 7 labelled PPI. Received pulses are likewise supplied in a manner to be explained later in greater detail to a selected one of four cathode ray tubes 8–11, each of which is labelled RHI and upon which are given sequentially range and height information concerning reflecting objects.

The antenna 4 comprises a parabolic metallic reflector 12 which is supported by means of a vertical support 13, the reflector 12 being so inclined that a line perpendicular to the axis of the reflector forms a small angle $\theta$ with the support 13. The support and reflector are arranged to be rotated slowly about the vertical axis of the support by any suitable means, such as the motor 14 connected to the support 13 through a driving pinion 15 and a gear 16. The wave guide 3 connected to the transmitter 1 includes a rotating coupling 17 supplied with a plurality of half wave chokes 18 to prevent leakage of ultra high frequency energy. The wave guide 3 is brought down above the parabolic reflector 12 and its lower end is supported by a plurality of rods 19 affixed to the reflector. Where horizontally polarized waves are to be radiated, the rods 19 must lie in a vertical plane or be inclined at a small angle to such a vertical plane. An S-shaped rotating section of wave guide 20 is coupled to the fixed section 3 near the supports 19 by means of another rotating coupling 21 constructed similar to the coupling 17. The rotating section 20 is supported by a ball bearing structure 22' and driven by a rod 22 formed of any suitable dielectric material, such as polystyrene for example, and which passes along the axis of the reflector 12. The rotating portion 20 of the wave guide is inclined at a small angle to the axis of the parabolic reflector 12 and is counterbalanced by means of a weighted arm 23. The section 20 is adapted to be rotated rapidly by means of a motor 24. The motor 24 likewise is directly connected to a two-phase generator 26 having two pairs of output leads 27, 28. A first selsyn motor 29 having output leads 30 is directly connected to the rotating vertical shaft 13, and a second selsyn motor 25 is connected to shaft 13 through a gear drive which increases the speed of rotation of the rotor of the selsyn motor 25.

Constructed in the manner outlined above, the section 20 of the wave guide rotates rapidly about the axis of the parabolic reflector 12 to project a beam of high frequency energy into space which sweeps over a conical section in space, the angle at the vertex of the cone being determined by the angle that the rotating section 20 makes with the axis of the reflector 12. In the apparatus used, this angle was about 15° for desired coverage of elevation angle. Furthermore, the angle $\theta$ formed between a line perpendicular to the axis of the reflector 12 and the vertical support 13, is such that the lower side of the cone of radiation is substantially at the horizon. If the parabolic reflector 12 is rotated slowly in azimuth by the motor 14, all space from the horizon to an elevation determined by the angle of the above-referred to cone of radiation eventually is illuminated. The path described in space by the rotating antenna may best be explained by reference to Fig. 1a. It is evident from this figure, that for a given speed of rotation there may be provided complete coverage of all the space between the horizon and a predetermined angle of elevation. It is apparent furthermore that for a given conical beam width a maximum azimuth speed exists above which all space is not covered, that is, between each rotation of the wave guide section 20, the reflector 12 must not advance in azimuth by more than one beam width. For azimuth speeds equal to or below this maximum rate, there is complete coverage of all space below the maximum elevation and within the range limits of the system.

The pulses of high frequency energy radiated from the antenna 4 are projected through space and impinge upon remote objects producing echoes which are intercepted by the antenna 4 and are transmitted over the wave guide 3 to the receiver 5 and which include the usual TR box 31, best seen in Fig. 2. The equipment 31 operates to protect the equipment of the receiver from the high intensity of the pulses produced by the transmitter 1. The received oscillations are mixed in the receiver 5 with local oscillations to produce oscillations of a low or intermediate frequency in the usual manner. The intermediate frequency oscillations are detected by a detector, not shown, and amplified by a video amplifier 32. Video signals are supplied over a lead 33 to the control electrode 34 of the cathode ray oscillograph 7. The cathode ray oscillograph 7 is labelled PPI and is commonly known as a plan position indicator. The PPI tube 7 has a magnetic yoke 35 consisting of four coils on the four sides of the neck of the cathode ray device and to which are supplied sawtooth waves in a manner to be described later. The yoke 35 is mechanically connected for rotation about the PPI tube synchronously with the vertical support 13 for the antenna 4 by means of a selsyn motor 36 which is geared to the yoke 35 by a gear 37. Energy is supplied to the selsyn motor 36 over a lead 30 connected to the selsyn motor 29. Also connected to the lead 30 and to the receiver 5 is a protective circuit 38 which is arranged to desensitize the receiver and to remove the video voltages from the control electrode 34 when the antenna 4 stops rotating in azimuth. In this way the tube 7 is safeguarded from burning, if antenna rotation should stop.

Means are provided for supplying scanning potentials to the deflection yoke 35 and comprise a radial sweep circuit and a cross sweep circuit. The radial sweep circuit comprises a multivibrator 39 which is keyed by the keyer 2 to control operation of a sawtooth wave generator 40. The sawtooth waves, indicated by the legend 41, are amplified by an amplifier 42 and supplied to one winding comprising two serially connected coils on opposite sides of the yoke 35. Since the multivibrator 39 is connected to the keyer 2, the sawtooth waves 41 are synchronized with the pulses transmitted to the transmitter 1. The waves 41 operate to deflect the cathode ray beam of tube 7 outward from the center of the scale over a period of time equal to that required for a radiated wave to travel to the most remote object to be detected and return. In order that the trace of the cathode ray on the tube 7 coincide with the instantaneous azimuth position of the S-shaped section of rotating wave guide 20, a cross-sweep circuit is provided. This circuit comprises a sawtooth wave generator 43 which is connected to both the multivibrator 39 and to the lead 27 of one of the phases of the two-phase generator 26. The sine wave of voltage generated in this phase corresponds to azimuth departures of the S-shaper section of wave guide 20 during a single rotation of this section, i. e., the azimuth position as contrasted with the elevation position of the section 20. The output wave of the sawtooth wave generator is indicated by the legend 44 and comprises a plurality of sawtooth waves of equal time occurrence but varying in magnitude from a maximum positive value to a maximum negative value. These sawtooth waves 44 are amplified by amplifier 45 and supplied to the second winding, not shown, and comprising two serially connected coils on opposite sides of the yoke 35. This second winding is in quadrature with the winding to which the waves 41 are supplied. The magnitude of the waves 44 may be varied by means of a width control indicated by the variable resistor 46. The sawtooth waves 41, 44 are added vectorially due to the positioning of the coils on the yoke 35 at right angles to provide a resultant voltage 47 which is indicated in the diagram to the left of the tube 7 in Fig. 2. As may be seen from the vector diagram there shown, the phase of the voltage 47 varies over an angle which may be adjusted by means of the control 46 to equal the vertex angle of the cone of radiated pulses previously described.

The PPI cathode ray tube 7 may be of the dark trace tube type and may be provided with a suitable projection system indicated conventionally by the lens 7'. In a particular apparatus, applicant has found a projection system of the Schmidt system type extremely satisfactory. The projection system 7' places an enlarged image of the screen of the tube 7 upon a projection screen 48' upon which are inscribed scales 48, 49 indicating, respectively, range and azimuth. The tube 7 may be, for example, a 4-inch cathode ray tube and the projection screen may be 28 inches in diameter. The resultant wave 47 of the radial sweep and cross-sweep circuits traces out a sector on the tube 7, the angle of which corresponds to the angle of the cone of radiated energy. Since the yoke 35 is mechanically connected, by means of selsyn motor 36, with the selsyn motor 25 and thus with the reflector 12, the illuminated sector on the PPI tube rotates synchronously with the antenna. In the sweep circuit, the sawtooth wave 41, in any given interval, displaces the ray from the center of the concentric range lines 48 by a radial distance which corresponds to the time required for a wave to travel to a reflecting object and return. At the same time, the sawtooth wave 44 displaces the ray laterally to a position corresponding to the instantaneous azimuth position of the rotating wave guide section 20. Preferably, the magnitude of the sawtooth wave 41 is adjusted so that the distance to a reflecting object may be read directly from the range lines 48. Thus, if the range lines each indicate a distance of ten miles, the indication 50 appearing on the PPI tube 7 corresponds to a reflecting object approximately forty-five miles distant from the antenna.

As previously stated in the discussion of the system illustrated in Fig. 1, the apparatus of my invention includes four range-height indicator tubes 8-11 which are referred to hereinafter as RHI tubes. Video pulses for these tubes are supplied from video amplifier 32 of Fig. 2 over a lead 51 to control grids of respective tubes through a circuit now to be described. These circuits include a range sweep circuit, a height sweep circuit, and circuits for projecting vertical and horizontal markers on the end wall of the respective tubes.

The range sweep circuit of the RHI tubes, as shown in Fig. 2, comprises a multivibrator or square wave generator 52 which is connected through a buffer stage 53 to the keyer 2. The multivibrator 52 is constructed and arranged in a manner well known in the art to provide positive square waves 54 and negative square waves 55 having the same time occurrence. The square wave pulses 55 are supplied to a sawtooth wave generator 56 to provide a succession of sawtooth waves 57. The sawtooth waves 57 are amplified by an amplifier 58 and supplied to the horizontal deflection coil 59 of the RHI tube 8. The positive square waves 54 are likewise supplied through a set of contacts 61 on a relay 60 to an anode 62 of tube 8 to intensify the illumination of the RHI tube 8 during periods when a trace is being made and to reduce the illumination during retracing periods. The relay 60 is shown in energized position in Fig. 2.

The height sweep circuit for the RHI tubes comprises a sawtooth wave generator 63 which is supplied with the positive square wave pulses 54 through a gating device 64 and which may comprise, for example, a diode which is non-conducting in the absence of the square waves 54 and which prevents generation of sawtooth waves during these periods. The sawtooth wave generator 63 is likewise connected by the lead 28 to the second phase of the two-phase generator 26 shown in Fig. 1. The lead 28 may be connected to the sawtooth wave generator 63 through a source 65 of unidirectional potential which raises the average potential of the sine wave with respect to ground so that the potential supplied to the generator 63 over the lead 28 is never negative with respect to ground. The resultant wave 66, which is provided by the sawtooth wave generator 63, is a series of sawtooth waves of voltage which vary in magnitude from zero to a maximum positive value. The wave 66 is amplified in an amplifier 67 and supplied to the vertical deflection coil 69 in the RHI tube 8. The constant magnitude sawtooth waves 57 and the sawtooth waves 66 of varying magnitude are added vectorially through the cross action of coils 59, 69 to provide a deflecting voltage which causes the ray of the tube 8 to trace horizontally across the face of tube 8 from left to right and vertically upward, the resultant position of the ray at any particular moment depending upon the vector sum of the two instantaneous sawtooth voltages 57, 66. Means are provided for adjusting the position of the ray horizontally and vertically in accordance with known values and comprise respectively the variable resistors 70, 71.

Reference is now made briefly to Fig. 3 in which is shown the "graph paper" display which is projected on the fluorescent viewing screen of the RHI tubes to assist in determining accurately the range and elevation of a reflecting object. This display comprises a series of spaced vertical and horizontal dots which form, upon the screen of the cathode ray tube, a portion of a rectangular coordinate system the abscissa of which indicates the distance or slant range of a reflecting object and the ordinate of which indicates the elevation of that reflecting object. The dots are so formed by means to be explained in detail later that they form essentially continuous vertical and horizontal lines. In the display illustrated in Fig. 3, every fifth one of each of the horizontal and vertical lines is more intensely illuminated than the remaining lines. Thus, considering the vertical range lines, each line may represent a range of two miles and each fifth line thus represents a distance of ten miles to a reflecting object. The horizontal lines may represent a height of two thousand feet and each fifth or more intensely illuminated line, ten thousand-foot divisions. Since, as has been previously described, the off-axis antenna produces a conical scanning beam, the indication of a reflecting object on the RHI tube appears as a vertical line. Thus, on the display shown in Fig. 3, the vertical line 72 indicates that a reflecting object, such as an airplane, is located at a distance of approximately thirty-three miles from the antenna and at a height above the horizon of approximately twenty thousand feet.

Referring now again to Fig. 2, I have shown in the lower portion of that figure, in block diagram, the circuits of my system which provide the range and height markers in the "graph paper" display. The height marker display circuit comprises a sawtooth generator 73 which is connected to the lead 28 of that phase of the two-phase generator 26 which corresponds to elevation departures of S-shaped section of wave guide 29 during a single rotation of this section. The lead 28 is connected to the generator 73, through the means 65 for raising the average unidirectional potential of the sine wave, so that the voltage supplied to the sawtooth generator 73 is never negative with respect to ground. The sawtooth wave generator 73 is likewise gated by gating means 74 which is responsive to the square wave pulses 54. The resultant pulses of the sawtooth waves, indicated by the legend 75 in Fig. 2, in the output of the sawtooth generator 73 all have the same overall time occurrence, that time being determined by the duration of one of the square wave pulses 54. However, the number and slopes of the sawtooth waves in each pulse differ, varying with the instantaneous value of the sine wave voltage supplied to the input of the sawtooth generator. The duration of one of the pulses of sawtooth waves 75 is the time which is required for a pulse of signals from the transmitter 1 to be radiated from the antenna 4 and reach a reflecting object at a maximum distance and for an echo pulse to return to the system.

The sawtooth waves 75 are supplied to a trigger circuit 76 which is connected to a blocking oscillator 77. A feedback connection 78 is provided between the blocking oscillator 77 and the input of the trigger circuit 76. The trigger circuit 76, the exact nature of which is shown in Fig. 5 and which is described in greater detail hereinafter, is such that it provides pulses of sawtooth waves, the number of which vary with the slope of the sawtooth waves 75. The blocking oscillator 77 is effective to provide a series of waves, the repetition frequency of which varies with the number of the sawtooth waves in the output of the trigger circuit 76. The waves of varying frequency in the output of blocking oscillator 77 are supplied through contacts 80 on relay 60 to the grid 81 in the RHI cathode ray tubes to appear as intensity modulations on the trace of the height sweep of the RHI tubes.

The action of the height marker circuit just described may be best explained by considering a typical sweep operation in the RHI tubes. Normally the range and height sweep circuits, which provide the sawtooth waves 57, 66, effect a sweeping from left to right across the face of the RHI tube. Each trace starts at the origin or point 82, as indicated in Fig. 3. When the sawtooth wave 66 is at zero value, the sweep is horizontally across the face of the tube from this point. When the next sawtooth wave 66 of slightly positive value occurs, the sweep will start at the point 82 and be inclined at a slight angle with the horizontal position. This angle increases as the magnitude of the sawtooth wave 66 increases. The time for each trace is equal to the time occurrence of each of the sawtooth waves 57, 66. This time is determined by the duration of a single square wave pulse 54. If we consider the function of the height marker circuit, the purpose of this circuit is to place dots on the trace at varying intervals depending upon the angle the trace makes with the horizontal position. The frequency with which these dots must be placed on the trace of course depends upon the angle which that trace makes with the horizontal plane. Thus, if the particular trace is to indicate only objects up to an elevation of two thousand feet, for example, a single dot is required on that trace, which dot must occur at the end of the trace. However, if the trace corresponds to the sweep for an elevation of ten thousand feet, five dots must be supplied, these dots appearing as the trace crosses each of the two thousand-feet elevation lines. These varying frequency waves, which produce the dots on the trace, are provided by the blocking oscillator 77. The repetition frequency of this oscillator is determined by the number of the sawtooth waves in the output of the trigger circuit 76.

In order to provide means for intensifying illumination of every fifth horizontal line of the "graph paper" display, an electronic counter 83 is connected to the output of the blocking oscillator and is used to control the repetition frequency of a second blocking oscillator 84. Counter 83 may comprise a capacitance charging circuit and may be such, for example, that it provides a pulse of voltage to the blocking oscillator 84 for each fifth pulse of voltage in the output of blocking oscillator 77. The output of the blocking oscillator 84 is connected to the output of the oscillator 77 and to the grid 81 to provide a more intense modulation signal for each fifth signal of the blocking oscillator 77. The combined signals of the oscillators 77, 84 are effective to produce a more intense spot on the vertical sweep of the cathode ray tubes 8–11. On a given tube, the resultant effect of the height marker circuit is to provide a plurality of dots at spaced vertical positions. These appear essentially as horizontal lines across the face of the cathode ray tubes.

Means are provided also for modulating the grid 81 in accordance with range sweeping to provide the vertical reference lines on the "graph paper" display. This means comprises a constant voltage source 85 which is connected to the input of a sawtooth generator 86. The sawtooth generator 86 is likewise supplied with positive gating signals from the multivibratror 52 through a gating circuit 87. The output waves of the generator 86 consist of sawtooth waves 88 having equal slopes and time occurrences. The waves 88 are supplied to a trigger circuit 89 to provide evenly spaced impulses to a blocking oscillator 90. The feedback connection 91 between the blocking oscillator 90 and the trigger circuit 89 is effective to provide impulses of constant repetition frequency in the output of the blocking oscillator 90 which are supplied to the grid 81.

In the operation of the range marker circuit, the traces across the face of the range-height indicator tube are provided with dots at equally spaced intervals. These dots may be made to occur at positions corresponding to distances spaced two miles apart during the sweeping operation. The total number of such markers of course is determined by the duration of the positive square waves 54. Their effect is to provide a series of vertical lines spaced apart by distances equivalent to two miles. Means are also provided to intensify each fifth marker so that the ten-mile lines appear more intensely illuminated on the face of the cathode ray tube. This means comprises an electronic counter 92 which is connected to a blocking oscillator 93. The output of the blocking oscillator 93 is connected to the output of blocking oscillator 90 so that each fifth impulse applied to the grid 81 is more intense.

As stated previously, four RHI tubes 8-11 are provided to permit a plurality of observers to assist in detecting reflecting objects and in determining their azimuth, range, and elevation. These tubes, moreover, are connected by a circuit which provides selective energization of the individual tubes in accordance with the azimuth angle to be covered by each observer. Considering the circuit of the relay 60, for example, of the RHI tube 8, one terminal of the winding of this relay is connected through a resistance 94 to the positive terminal of a source of unidirectional voltage, for example, the battery 95. The negative terminal 97 of the winding of relay 60 is connected through a set of contacts 96, which are closed when the relay is energized, to a point 96' of less positive potential on battery 95. The terminal 97 is connected likewise to a movable contact 98, seen in Fig. 4, depending from the top of a table 99 which contains the PPI tube and the screen 48'. A ring gear 101 has mounted thereon a contact 102 which is connected to ground through a resistance 102'. The ring gear 101 is driven by means of a pinion 103 connected to the shaft of a selsyn motor 104. The motor 104 in turn is connected by lead 25' to the selsyn 25 rotating with antenna support 13.

As may be seen in Fig. 1, three additional markers 105-107 are provided and are connected respectively to the relays 9'-11' (seen in Fig. 2) which energize respectively RHI tubes 9-11. Each of the markers 105-107 is movable in position between the inner edge of the table 99 and the screen 48' and each carries a respective one of the contacts 105'-107'. These contacts form the negative terminals of the windings of relays 9'-11'.

In the circuits of the relays 60, 9'-11', the values of resistances 94, 102', the resistances of the windings of the relays, and the potentials of battery 95 and tap 96' are so proportioned that each of the relays is energized when the respective one of depending contacts 98, 105'-107', touches the contact 102 and all other relays are deenergized. For example, after the contact 102 moves from the depending contact 98 the winding of relay 60 has impressed thereacross a lower potential, namely, the potential difference between the positive terminal of battery 95 and tap 96'. This potential is sufficient to maintain the previously energized relay 60 in its energized condition. When contact 102 reaches the next depending contact 105', the full potential of battery 95 is impressed across the circuit comprising the resistance 94, the winding of relay 9' and the resistance 102'. The potential drop across resistance 94 increases, therefore reducing the effective voltage across relay 60 and causing this relay to become deenergized. During the period that contact is maintained between the members 105', 102, resistance 102' functions to prevent short-circuiting of the portion of battery 95 between tap 96' and ground.

The rotating contact 102 is synchronized by means of the selsyns 25, 29 connected with the rotating antenna structure, selsyn 36 which drives the PPI deflection yoke 35, and selsyn 104 which drives ring gear 101 so that its position varies with the position of the illuminated sector on the PPI tube. Hence, as this illuminated sector rotates over the screen of the PPI tube, the RHI tubes 8-11 are energized sequentially. Since the markers 100, 105-107 are independent and movable, the azimuth angle covered by a particular RHI tube may be varied in accordance with existing conditions.

In early searching for reflecting objects such as airplanes, it may be desirable that all observers have a continuous indication of range and height of any reflecting objects. Means are provided, therefore, for energizing all of the RHI tubes at one time and comprise gang connected switches 108 which complete the circuits of the relays 60, 9'-11', by grounding the contacts 97, 105'-107', through a resistance 109 and by short-circuiting resistance 94. While normally it may be desirable that each observer cover a quarter of the complete azimuth angle, it is apparent that, simply by moving any one of the markers 100, 105-107, the portion of the azimuth angle covered by any particular observer may be varied. In this way if more than one group of reflecting objects, such as flights of airplanes, occur in any quadrant, two or more observers may view a selected portion of that quadrant for observation purposes by simply moving the associated marker into that quadrant. Moreover, the angle between adjacent markers indicates the portion of the complete azimuth angle covered by any particular observer. Of course, the range and azimuth of all reflecting objects are given on the PPI tube.

Referring now to Fig. 5, I have there shown in detail a portion of the height marker circuit shown in block form in Fig. 2. The sine wave from the two-phase generator carried by the rotating antenna is supplied over conductor 28 to the anode of a diode 110 and the cathode of a triode 111. A gating pulse is supplied to the grid of triode 111 through a transformer 112, connected to multivibrator 52 (shown in Fig. 2). The sine wave supplied over conductor 28 is impressed across a sawtooth wave generator comprising a resistance 113 connected in series with a condenser 114 and another resistance 115. The diode 110 and triode 111 serve to decouple the sine wave input from the sawtooth wave generator for the duration of gating pulses. A diode 116 is connected across resistance 115, the anode of the diode being connected to the grounded end of resistance 115 and the cathode being connected to the common terminal of resistance 115 and condenser 114. A clamping circuit which prevents the point 117, between resistance 113 and condenser 114, from becoming negative with respect to ground is connected between point 117 and ground and comprises a diode 118 having its cathode connected to point 117 and its anode connected to ground. The diode 119 has its anode likewise connected to point 117 and its cathode connected through a resistance 120 to a source of negative unidirectional potential. The positive square waves 54 in the output of multivibrator 52 are supplied to the cathode of diode 118. The waves 54 are effective to permit the point 117 to become positive with respect to ground for the duration of each of the square waves 54. As has been pointed out previously, the duration of the waves 54 is correlated with respect to the distance to be covered by the detecting and ranging equipment and is equal to the time required for a signal radiated from the antenna 4 to reach a reflecting object and for echo signals to return to that antenna.

For the duration of each of the square waves 54, the circuit 113—115 is effective to generate sawtooth pulses having a slope proportional to the voltage impressed across the circuit comprising elements 113—115. As has been previously explained, while these pulses of sawtooth waves have equal time duration, their number and slope vary in accordance with the variations in amplitude of the portions of the sine wave impressed across the sawtooth generator between gating pulses. The sawtooth waves 75 are impressed upon the grid of a cathode follower tube 121, the anode of a gating tube 122, and the grid of a tube 123 which forms the normally non-conducting tube of the trigger circuit 76. The anode of cathode follower tube 121 is connected to a source of positive voltage indicated by the legend + and its cathode is connected through a resistance 124 to a source of negative potential. The grid of gating tube 122 is likewise connected through a resistance 125 to a source of negative potential and to ground through a resistance 126 and by-pass capacitor 127. The anode of the normally non-conducting tube 123 of the trigger circuit is connected to a source of positive potential indicated by the legend + through a resistance 128 and the cathode is connected to ground through a resistance 129. The anode is likewise connected to a source of negative potential indicated by the legend—through resistances 130, 131, and 132. The anode of tube 123 is further connected to the grid of normally conducting tube 133 through a condenser 134. The grid of tube 133 is normally supplied with a positive potential through a voltage divider which comprises the resistances 128, 130—132 connected between the positive and negative sources of potential, the grid of tube 133 being connected to a variable point on this voltage divider by a variable contact 135. The anode of the tube 133 is coupled to the control grid 136 of an electron discharge device 137 in the blocking oscillator 77. The cathode of the device 137 is grounded and the anode is connected to a source of positive voltage through an inductance 138 which forms one winding of a transformer. A second winding 139, which forms a feedback between the anode and grid circuits of tube 137, is connected between the control grid 136 and a source of negative potential through a resistance 140 and to ground through a resistance 141 and a by-pass capacitor 142. A third winding 143 of the transformer functions as a source of feedback voltage between the blocking oscillator and the gating tube 122, one terminal of the winding 143 being connected to ground and its other terminal to the cathode of the device 122.

In the operation of the circuit depicted, when a sine wave of voltage is impressed across the sawtooth wave generator 73 during a positive square wave 54, a sawtooth voltage wave is impressed on the grid of the normally non-conducting tube 123 of the trigger circuit 76. This sawtooth wave produces a negative pulse of voltage in the output of tube 123 which is impressed on the grid of the normally conducting tube 133 to render this tube non-conducting. The control grid 136 of blocking oscillator 137 is normally supplied with a negative potential through winding 139 and resistance 140 to render this tube non-conducting. When the tube 133 is cut off, a positive pulse of voltage is supplied to grid 136 to produce an oscillation in the blocking oscillator 77. This oscillation is fed back by means of the winding 143 to the cathode of tube 122, rendering the tube 122 conductive and stopping conduction in the normally non-conducting tube 123. This introduces a positive pulse of voltage in the output of tube 123 to start conduction in tube 133 and prevent further oscillations in the oscillator 77. In the composite circuit, therefore, the number of pulses of voltage supplied to the blocking oscillator 77 by the trigger circuit 76 depend upon the slope of the sawtooth wave supplied to the grid of tube 123. As has been previously stated, the slope of the sawtooth waves 75 varies sinusoidally. Hence, the repetition frequency of the pulse of oscillations in the winding 138 varies with the slope of the sawtooth waves supplied to the trigger circuit 76. Thus, oscillations are supplied through a coupling capacitor 144 to a conductor 145 which is connected to the grid of the RHI tubes in the manner previously described.

In the above description of the apparatus of Fig. 1 and the circuit of Fig. 2, the RHI display has been described as including a projected system of rectangular coordinates. My invention, however, contemplates the use, with a cathode ray tube, of means for projecting any desired system of coordinates. Thus, by the use of my invention, a system of polar coordinates may be projected in a cathode ray tube and used as a plan position indicator. Thus, referring to the circuit of Fig. 2, such a system of coordinates may be obtained by eliminating the connection 28 which supplies a sine wave to the input of sawtooth generator 73, as well as the constant voltage source 85, and providing waves of suitable form to the sawtooth generators 73, 86 to obtain any desired coordinate system. An important advantage of using a projected system of coordinates is that it can be automatically synchronized with received signals or with a rotating antenna so that greater accuracy in measuring distances and directions is obtained.

My invention also contemplates the use of other means for sequentially transferring received intelligence between the RHI tubes in accordance with the position of a picture on a PPI tube. One form of such other means is shown in Fig. 6 in which a photoelectric cell 146 is supported in the marker 100 and focused upon the screen 48'. The photoelectric cell 146 is connected to a relay 147 which, when energized, closes contacts connecting the lead 97 to a source of negative potential, completing the circuit to relay 60. A similar photoelectric cell circuit may be included in the markers 105-107, the transfer of intelligence from one RHI tube to the next occurring as the rotating display on the PPI tube 7 as projected on screen 48' comes into the field of vision of photoelectric cell 146.

An important advantage of my improved radio detection and ranging equipment is that information concerning the height of reflecting objects, such as airplanes, is obtained accurately and automatically. This information is given on the "graph paper" display on the RHI cathode ray tubes and is made available to a plurality of observers individually or simultaneously. Since the azimuth angle which can be handled by any particular observer is variable in accordance with change in requirements, flexibility as to operation of the system is permitted. Furthermore, a single PPI display, in which a system of range and azimuth coordinates permits plotting the number and course of reflecting objects, permits all the observers to obtain an overall view of the position of any airplanes, in a case when the system is used for airplane detection.

In the "graph paper" display of RHI cathode ray tubes, by the use of a system of rectangular coordinates in which certain of the projected coordinates are more intensely illuminated than others, errors in making the readings are reduced and, in addition, the obtaining of height and range information is facilitated.

Another important advantage of my improved system is the use of an antenna which provides complete coverage of space up to a desired angle. By rotating a section of wave guide in front of a parabolic reflector, a cone of space is scanned in each rotation, the rate of change of azimuth angle being such that there is complete overlapping of all portions of space included in a predetermined apex angle. In any system, the three-dimensional scanning action of the antenna is translated into a two-dimensional scanning action of a PPI cathode ray tube. On this tube, the display covers an angle equal to the angle of space covered by the cone of radiation.

Since both range-height indications and plan position indications are provided, greater reliability or accuracy is obtained in following relatively weak reflecting signals. In this respect it has been found that signals out to the limit of the range of the equipment are picked up relatively easily and located with extreme accuracy. Furthermore, since a maximum solid angle is covered by the rotating antenna system, there is substantially no limitation on coverage of reflections from high altitude objects.

While my invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. In a radio echo system in which impulses are transmitted and echo impulses are received after reflection from an object in space, a plurality of viewing screens, means to indicate on one of said screens the azimuth angle of said object, means to indicate the elevation of and distance to said object on the remaining ones of said screens sequentially in accordance with the azimuth angle of said object, and means for disabling said last means and for indicating simultaneously on said remaining screens the elevation of and distance to said object.

2. In a radio echo system in which impulses are transmitted and echo impulses are received after reflection from objects in space, the combination of an antenna, means for rotating said antenna through an azimuth angle of 360°, a plurality of viewing screens, means for indicating on one of said screens the azimuth angle of said objects, and means responsive to rotation of said antenna for indicating sequentially on the remaining of said screens the elevation of and the distance to objects located within different azimuthal sectors of said 360° angle.

3. In combination, a cathode ray tube comprising means for producing a cathode ray, a control electrode, ray deflecting means, and a viewing screen, means for supplying a sweep voltage to said deflecting means to move said ray across said screen in a repeated series of spaced radial directions, and means forming a plurality of indicia on said screen in the form of a system of rectangular coordinates thereon comprising a source of control voltage of variable amplitude, means responsive to said control voltage for producing pulses having a repetition rate corresponding to the instantaneous amplitude of said control voltage, and means for applying said pulses to said control electrode.

4. In combination, a cathode ray tube comprising means for producing a cathode ray, a control electrode, ray deflecting means, and a viewing screen means for supplying a sweep voltage to said deflecting means to move said ray across said screen in a repeated series of spaced radial directions, and means forming a plurality of indicia on said screen in the form of a system of rectangular coordinates thereon comprising a source of sinusoidal control voltage, means responsive to said control voltage to produce pulses having a repetition rate variable in accordance with the amplitude of said control voltage, and means for applying said pulses to said electrode.

5. In combination, a cathode ray tube including means for producing a cathode ray beam, beam deflecting means, and a viewing screen, said deflecting means comprising a pair of means for exerting transverse forces on said beam, means for supplying successive sawtooth waves of voltage of constant magnitude to one of said pair of means, and means for supplying successive sawtooth waves of voltage of the same phase and repetition frequency as said first-mentioned waves, but of varying magnitude to the other of said pair of means, whereby a predetermined sector of said screen is scanned.

6. In a radio echo system in which impulses are transmitted and echo impulses are received after reflection from an object in space, an antenna comprising a reflector, a section of wave guide supported in front of said reflector and inclined at an angle to the axis of said reflector, means for rotating said section about said axis, transmitting and receiving means connected to said wave guide, said receiving means including a cathode ray tube having a viewing screen and ray deflecting means, and means interconnecting said rotating means and said ray deflecting means for translating the rotary scanning motion of said antenna to simple harmonic scanning of said screen.

7. A radio detecting and ranging system comprising means for producing recurrent pulses of electromagnetic waves, means for radiating a directive beam of said waves and for receiving echo waves after reflection from objects in space, means for rotating said beam in azimuth, a plurality of viewing screens, means for indicating on one of said screens the azimuth angle and the distance to said objects, and means to indicate the elevation of and the distance to said objects on the remaining of said screens sequentially in accordance with different azimuthal sectors swept by said radiating means during rotation.

8. In a circuit for a cathode ray tube of the type including means for producing a cathode ray, a control electrode, ray deflecting means, and a viewing screen, means for producing first successive sawtooth waves of voltage of constant magnitude, means for producing second successive sawtooth waves of voltage varying in magnitude, means connecting said ray deflecting means and said first and second voltages to move said ray across said screen in a repeated series of evenly spaced radial directions, means providing successive pulses of voltage of constant frequency, means providing successive pulses of voltage of varying frequency, and means supplying both of said pulses of voltage to said electrode, whereby a plurality of rectilinearly disposed indicia are placed on said screen to form a system of rectangular coordinates thereon.

9. An arrangement for producing display indicia comprising a source of variable amplitude voltage, means for producing sawtooth waves having a slope variable in accordance with the amplitude of said voltage, a source of pulses of controllable repetition rate, and means responsive to the slope of said wave for varying the repetition rate of said pulses.

10. An indexing arrangement comprising a source of variable voltage, a charging circuit for charging to a given voltage amplitude, means for varying the rate of charge of said circuit in accordance with the instantaneous amplitude of said variable voltage, means responsive to said charging circuit attaining a given voltage amplitude for producing an impulse, means responsive to said impulse producing means for substantially instantaneously discharging said circuit whereby pulses are produced at a variable occurrence rate corresponding to said variable slope.

11. An indexing arrangement comprising a source of variable voltage, a charging circuit for charging linearly to a given voltage amplitude, means for varying the rate of charge of said circuit in accordance with the instantaneous amplitude of said voltage, means responsive to said charging circuit attaining said given voltage amplitude to produce oscillations, means responsive to said produced oscillations to discharge said circuit, means responsive to the discharge of said circuit for halting said oscillations, whereby oscillations are produced at a variable time rate corresponding to said variable slope.

12. In a cathode ray tube display system comprising a screen and separate sets of deflection elements, means coupled to one set of elements for periodically producing a sweep on said screen, means for periodically producing a second sweep of variable amplitude on said screen coupled to the other set of deflection elements, means for producing coordinate markings variable in number in accordance with the amplitude of said second sweep coupled to said other deflection elements.

13. An arrangement according to claim 12 wherein the amplitude of said second sweep varies sinusoidally at a substantially lower rate than the periodicity of said first mentioned sweep.

14. An arrangement according to claim 13 further comprising means for intensifying predetermined plural integral multiple ones of said markings.

15. In a radio echo system in which impulses are transmitted and in which echo impulses are received after reflection from objects in space, a pair of viewing screens, means to visually indicate on one of said screens the azimuth angle and the distance to said objects, means to indicate on the other of said screens the elevation of and the distance to objects located within a selected azimuthal sector of said space, means for altering the azimuthal position of the selected sector, and means for varying the dimension of said selected sector.

16. In a radio echo system in which impulses are transmitted and echo impulses are received after reflection from objects in space, a plurality of viewing screens, means to indicate on one of said screens the azimuth angle of all of said objects, means to indicate sequentially the elevation of and distance to objects located within different azimuthal sectors of said space on respective remaining ones of said screens, and means for altering the azimuthal positions of said different sectors.

17. In a pulse-echo system in which impulses are periodically transmitted and in which corresponding impulses are received from objects in space, a cathode-ray indicator including means for producing a cathode ray, a control electrode, ray deflecting means and a viewing screen, means for producing a first sawtooth wave of constant magnitude and for producing a second sawtooth wave of varying magnitude, means coupling said last-mentioned means to said ray deflecting means to move said ray across said screen in a repetitive series of evenly spaced radial directions, means coupled to said control electrode for supplying thereto pulses of constant frequency and for supplying thereto pulses of variable frequency to form a plurality of rectilinearly disposed indicia on said screen constituting a system of rectangular coordinates defining two dimensions of said space, and means for indicating on said screen the position of said object with respect to said coordinates thereby to facilitate the determination of the location of said object in space.

18. In a wave-energy receiving system, unidirectional means for intercepting propagated wave energy, said means having a direction of maximum response defining a space pattern axis, means for rotating said space pattern axis about an annular path, a cathode ray indicator having a viewing screen, having means for projecting an electron beam toward said screen and having a pair of deflection elements for deflecting said electron beam in respective ones of two coordinates over said screen, a sweep generator coupled to one of said deflection elements for supplying thereto a sweep wave of substantially fixed maximum amplitude, resolving means coupled to said means for rotating said space pattern axis and coupled to said sweep generator for deriving a sweep wave having a maximum amplitude dependent upon the instantaneous positional values of the projection of said pattern axis upon a plane intersecting said annular path, and means coupling said resolving means to the other of said deflection elements whereby two-coordinate scanning of said viewing screen is effected in accordance with such positional values.

19. In a pulse-echo system, unidirectional means for transmitting repetitive pulses of wave energy and for intercepting said pulses after reflection by a remote object, said means having a direction of maximum response defining a space pattern axis, means for rotating said space pattern axis about an annular path, a cathode ray indicator having a viewing screen, having means for projecting an electron beam toward said screen and having a pair of deflection elements for deflecting said electron beam in respective ones of two coordinates over said screen, means coupling said means for intercepting pulses to said means for projecting an electron beam of said indicator to control the intensity of said electron beam in accordance with the interception of reflected pulses, a sweep generator synchronized with the transmission of pulses and coupled to one of said deflection elements for supplying thereto a sweep wave of substantially fixed maximum amplitude having undulations, each initiated concomitantly with the transmission of a pulse of wave energy and having a duration corresponding to the entire travel time of a pulse reflected from an object at a maximum range, resolving means coupled to said means for rotating said space pattern axis and coupled to said sweep generator for deriving a sweep wave corresponding in timing with said first-mentioned sweep wave, but having a maximum amplitude dependent upon the instantaneous positional values of the projection of said pattern axis upon a plane intersecting said annular path, and means coupling said resolving means to the other of said deflection elements whereby two-coordinate scanning of said viewing screen is effected in accordance with such positional values.

20. In a pulse-echo system, unidirectional means for transmitting repetitive pulses of wave energy and for intercepting said pulses after reflection by a remote object, said means having a direction of maximum response defining a space pattern axis, means for rotating said space pattern axis about a conical path disposed substantially in its entirely to one side of a horizontal plane, a cathode ray indicator having a viewing screen, having means for projecting an electron beam toward said screen and having a pair of deflection elements for deflecting said electron beam in respective ones of two coordinates over said screen, means coupling said means for intercepting pulses to said means for projecting an electron beam of said indicator to control the intensity of said electron beam in accordance with the interception of reflected pulses, a sweep generator synchronized with the transmission of pulses and coupled to one of said deflection elements for supplying thereto a sweep wave of substantially fixed maximum amplitude having undulations, each initiated concomitantly with the transmission of a pulse of wave energy and having a duration corresponding to the entire travel time of a pulse reflected from an object at maximum range, resolving means coupled to said means for rotating said space pattern axis and coupled to said sweep generator for deriving a sweep wave corresponding in timing with said first-mentioned sweep wave, but having a maximum amplitude dependent upon the instantaneous positional values of the projection of said pattern axis upon a vertical plane intersecting said path, and means coupling said resolving means to the other of said deflection elements whereby two-coordinate scanning of said viewing screen is effected in accordance with such positional values to provide a range versus height display of indications of reflecting objects.

GEORGE W. FYLER.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,176,973 | Bowman-Manifold | Oct. 24, 1939 |
| 2,178,074 | Jakel et al. | Oct. 31, 1939 |
| 2,274,098 | Shore | Feb. 24, 1942 |
| 2,280,531 | Norgaard | Apr. 21, 1942 |
| 2,292,045 | Burnett | Aug. 4, 1942 |
| 2,401,432 | Luck | June 4, 1946 |
| 2,403,562 | Smith | July 9, 1946 |
| 2,405,231 | Newhouse | Aug. 6, 1946 |
| 2,405,238 | Seeley | Aug. 6, 1946 |
| 2,409,183 | Bech | Oct. 15, 1946 |
| 2,412,703 | Wolff | Dec. 17, 1946 |
| 2,416,199 | Nagel | Feb. 18, 1947 |
| 2,416,200 | Nagel | Feb. 18, 1947 |
| 2,416,290 | Depp | Feb. 25, 1947 |
| 2,419,239 | White | Apr. 22, 1947 |
| 2,421,747 | Engelhardt | June 10, 1947 |
| 2,422,361 | Miller | June 17, 1947 |
| 2,426,189 | Espenschied | Aug. 26, 1947 |
| 2,426,654 | White | Sept. 2, 1947 |
| 2,429,601 | Biskenborn | Oct. 28, 1947 |
| 2,437,286 | Witt | Mar. 9, 1948 |
| 2,471,516 | Bryant | May 31, 1949 |
| 2,512,086 | Bowen et al. | July 20, 1950 |
| 2,519,397 | Ranger | Aug. 22, 1950 |